(12) United States Patent
Klemann et al.

(10) Patent No.: US 12,161,108 B2
(45) Date of Patent: Dec. 10, 2024

(54) AGRICULTURAL SPRAYING DEVICE

(71) Applicant: Amazonen-Werke H. Dreyer GmbH & Co. KG, Hasbergen (DE)

(72) Inventors: Timo Klemann, Belm (DE); Stefan Kiefer, Osnabrück (DE)

(73) Assignee: Amazonen-Werke H. Dreyer SE & Co. KG, Hasbergen (DE)

( * ) Notice: Subject to any disclaimer, the term of this patent is extended or adjusted under 35 U.S.C. 154(b) by 792 days.

(21) Appl. No.: 17/261,990

(22) PCT Filed: Oct. 18, 2019

(86) PCT No.: PCT/EP2019/078358
§ 371 (c)(1),
(2) Date: Jan. 21, 2021

(87) PCT Pub. No.: WO2020/083771
PCT Pub. Date: Apr. 30, 2020

(65) Prior Publication Data
US 2021/0307312 A1 Oct. 7, 2021

(30) Foreign Application Priority Data
Oct. 25, 2018 (DE) ..................... 10 2018 126 587.5

(51) Int. Cl.
*A01M 7/00* (2006.01)
*A01C 23/04* (2006.01)

(52) U.S. Cl.
CPC ........... *A01M 7/006* (2013.01); *A01C 23/047* (2013.01); *A01M 7/0089* (2013.01)

(58) Field of Classification Search
CPC .... A01M 7/006; A01M 7/0089; A01C 23/047
See application file for complete search history.

(56) References Cited

U.S. PATENT DOCUMENTS 4,116,138 A * 9/1978 McFarland .......... A01C 23/007
111/926
4,613,080 A 9/1986 Benson et al.
(Continued)

FOREIGN PATENT DOCUMENTS

DE  10 2006 038 688 A1  2/2008
EP     2 567 617 A2     3/2013
(Continued)

OTHER PUBLICATIONS

International Search Report issued Jan. 28, 2020 in corresponding PCT Patent Application No. PCT/EP2019/078358.

*Primary Examiner* — Qingzhang Zhou
(74) *Attorney, Agent, or Firm* — Mintz Levin Cohn Ferris Glovsky and Popeo, P.C.

(57) ABSTRACT

An agricultural spraying device includes a plurality of main dispensing units arranged on a sprayer boom, each of the main dispensing units configured for dispensing liquid onto agricultural land and including a distributor housing, the distributor housing having a liquid inlet and a plurality of liquid outlets and being configured to selectively advance liquid flowing in via the liquid inlet to a liquid outlet or distribute the liquid to a plurality of liquid outlets, and a plurality of auxiliary dispensing units, each of the auxiliary dispensing units configured to dispense the liquid onto agricultural land, a respective one of the liquid outlets of the distributor housings of the plurality of main dispensing units being connected via an additional line to a respective one of the auxiliary dispensing units.

15 Claims, 3 Drawing Sheets

(56) References Cited

U.S. PATENT DOCUMENTS

| | | | |
|---|---|---|---|
| 6,230,091 B1 * | 5/2001 | McQuinn | A01B 79/005 700/282 |
| 10,798,873 B1 * | 10/2020 | Shaath | A01C 23/047 |
| 2002/0144735 A1 * | 10/2002 | Nimberger | B05B 1/14 137/556 |
| 2006/0273189 A1 * | 12/2006 | Grimm | A01G 25/16 239/146 |
| 2013/0153676 A1 * | 6/2013 | Ballu | A01C 23/047 239/11 |

FOREIGN PATENT DOCUMENTS

| | | |
|---|---|---|
| EP | 2 570 027 A2 | 3/2013 |
| WO | 01/60525 A1 | 8/2001 |

* cited by examiner

AGRICULTURAL SPRAYING DEVICE

The present invention relates to an agricultural spraying device and a method of dispensing liquid onto agricultural land.

When liquid is dispensed onto agricultural land, agricultural spraying devices are used, the sprayer boom of these spraying devices having arranged thereon a plurality of dispensing units. The dispensing units may e.g. be configured as spray nozzles and are usually arranged equidistantly from one another.

Depending on the planned dispensing process and the crops growing on the respective agricultural land, different spray configurations may be of advantage. With some liquids, large-area dispensing over the entire agricultural land may be advantageous. Other liquids, however, are to be dispensed directly onto the agricultural crops in a row-related manner, so that area spraying should be avoided in this case. And with yet other liquids, contact with the agricultural crops should be avoided as far as possible, so that dispensing within intermediate areas, which extend e.g. between neighboring rows of plants, is preferred.

Known agricultural spraying devices already allow various dispensing variants, but this has so far necessitated considerable conversion work on the agricultural spraying device. For example, the dispensing units have to be positioned manually before the liquid is dispensed onto the agricultural land and fixed manually at the appropriate positions. Due to the high expenditure of time, which is necessary for the conversion work in question, such systems find only little acceptance on the market.

It is therefore the object of the present invention to make the dispensing of liquids onto agricultural land more flexible, without any complicated conversion work on the spraying device used being necessary.

This object is achieved by an agricultural spraying device of the type referred to at the beginning, in the case of which a respective liquid outlet of the distributor housings of a plurality of main dispensing units is connected via an additional line to a respective auxiliary dispensing unit.

The present invention makes use of the finding that, in addition to the main dispensing units arranged on the sprayer boom, a plurality of auxiliary dispensing units can be provided, by means of which additional dispensing methods can then be realized. For example, the main dispensing units may be used for large-area dispensing of the liquid over the entire agricultural land, and the auxiliary dispensing units can then be used for row-related dispensing of the liquid onto the agricultural land. According to the present invention, the auxiliary dispensing units are fed via the main dispensing units, so that a separate feeding system for the auxiliary dispensing units will not be necessary. Rather, the auxiliary dispensing units can be activated by unblocking the respective liquid outlets of the main dispensing units and deactivated by blocking the respective liquid outlets of the main dispensing units.

The main dispensing units are preferably configured as multiple nozzle bodies. In particular, one or a plurality of the liquid outlets of the distributor housings of the respective main dispensing units are coupled to a nozzle attachment. In this way, the main dispensing units can be used, on the one hand, for dispensing liquid and, on the other hand, for feeding the auxiliary dispensing units. The auxiliary dispensing units can thus be fed via the main dispensing units alternatively or additionally to the direct dispensing of liquid through the main dispensing units. The respective additional lines, which each connect a liquid outlet of a distributor housing of a main dispensing unit to an auxiliary dispensing unit, are preferably configured as flexible lines, in particular as hoses. The auxiliary dispensing units are preferably configured as spray nozzles.

According to a preferred embodiment of the agricultural spraying device disclosed by the present invention, the main dispensing units are stationarily attached to the sprayer boom. Alternatively or additionally, the auxiliary dispensing units are movable along the sprayer boom, and in particular movable transversely to the direction of travel. The main dispensing units are preferably arranged at a fixed and not variable distance from one another. The auxiliary dispensing units are preferably displaceable transversely to the direction of travel, so that the distance between the individual auxiliary dispensing units and the distance between the main dispensing units and the auxiliary dispensing units is variable. Due to the flexibility of the additional lines, via which the auxiliary dispensing units are fed, the displacement of the auxiliary dispensing units transversely to the direction of travel does not necessitate any adaptations whatsoever as regards the feeding of liquid. Hence, a freely adjustable distance between the individual auxiliary dispensing units is obtained. This makes the agricultural spraying device suitable for area spraying as well as for dispensing liquid in a row-related manner. For example, area spraying may be carried out first, the main dispensing units being in this case spaced approx. 50 cm apart. Subsequently, row-related dispensing of the spraying liquid can be carried out with the same agricultural spraying device and without any complicated conversion work being necessary. Row-related dispensing of the spraying liquid may be carried out such that the liquid is dispensed by means of the auxiliary dispensing units in a precisely localized manner onto plant rows on the agricultural land. Alternatively, the liquid may be dispensed in such a way that it is dispensed in a precisely localized manner onto intermediate areas extending between neighboring rows of plants. The dispensing of liquid along intermediate areas preferably serves the purpose of dispensing liquid fertilizer.

According to another preferred embodiment of the agricultural spraying device disclosed by the present invention, the auxiliary dispensing units are attached to a bar arranged below the sprayer boom and extending along the sprayer boom. Preferably, the auxiliary dispensing units are displaceable along this bar. The bar may be configured as a one-part or as a multi-part component. Preferably, the bar is connected to the sprayer boom via a plurality of fastening elements or is a component part of the sprayer boom. The bar may be a protective tube for the main dispensing units. Preferably, the auxiliary dispensing units are displaceable manually along the bar and/or adapted to be manually fixed through locking devices. Alternatively or additionally, the auxiliary dispensing units may be adapted to be displaced and/or fixed along the bar by means of one or a plurality of actuators.

In addition, an agricultural spraying device according to the present invention, in the case of which the distributor housing of one or of a plurality of main dispensing units is not connected to an auxiliary dispensing unit, will be of advantage. When the auxiliary dispensing units are equidistantly spaced from one another and when the main dispensing units are equidistantly spaced from one another, the distance between neighboring auxiliary dispensing units will preferably be larger than the distance between neighboring main dispensing units. In this case, only a few but not all the main dispensing units of the agricultural spraying device will be connected to an auxiliary dispensing unit. The liquid outlets of the distributor housings of the main dispensing units that are not connected to an auxiliary dispensing unit are preferably closed, in particular with a bling plug, and do not fulfil any other function.

According to a further development of the agricultural spraying device disclosed by the present invention, the agricultural spraying device comprises a control unit configured to control the flow through the liquid inlet and/or the flow through the individual liquid outlets of the distributor housings of the respective main dispensing units. For example, the liquid inlet and/or the respective liquid outlets may have assigned thereto valve units, by means of which the flow rate can be controlled. Making use of the valve units, the flow can also be fully blocked or unblocked. This allows the auxiliary dispensing units to be optionally switched on or off.

In addition, an agricultural spraying device according to the present invention will be of advantage, in the case of which the control unit is configured to determine an amount of liquid to be provided to the individual main dispensing units for a planned dispensing operation and to cause the determined amount of liquid to be provided to the respective main dispensing units. Since the auxiliary dispensing units may be spaced apart from one another at a distance that is larger than the distance between the main dispensing units, it may be the case that one or a plurality of the main dispensing units are not connected to an auxiliary dispensing unit. This interconnection of the dispensing units has to be taken into account upon determining the amount of liquid to be provided to the respective main dispensing units. Upon determining the amount of liquid to be provided to the respective main dispensing units, it will additionally have to be taken into account whether the liquid is to be dispensed only via the auxiliary dispensing units, only via the main dispensing units or via the auxiliary dispensing units and the main dispensing units.

According to a further preferred embodiment of the agricultural spraying device disclosed by the present invention, the control unit is configured to take into account the positions of the auxiliary dispensing units upon determining the amount of liquid to be provided to the individual main dispensing units. The information on the positions of the auxiliary dispensing units may be adapted to be inputted manually by a user, e.g. in the event that the auxiliary dispensing units are manually positionable. The positions of the auxiliary dispensing units may here be inputted by the user via an input device of the agricultural spraying device or they may be made known to the control unit via a mobile terminal. In this case, the user may also input the information on the positions of the auxiliary dispensing units manually via the mobile terminal. The positions of the auxiliary dispensing units may also be detected by a suitable detection unit of the agricultural spraying device, in particular in the event that the auxiliary dispensing units are movable via actuators of the agricultural spraying device. The detection unit may then comprise e.g. one or a plurality of sensor devices. Alternatively or additionally, the positions of the auxiliary dispensing units may, in this case, also be determined via the movement history of the individual auxiliary dispensing units. In this case, the displacement paths of the respective auxiliary dispensing units are evaluated, so as to determine the current position of the auxiliary dispensing unit in question.

Furthermore, an agricultural spraying device is of advantage, in the case of which the control unit is configured to take into account the state, in particular the switching state, of the respective main dispensing units upon determining the amount of liquid to be provided to the individual main dispensing units. The switching state concerns the flow rate settings at the liquid inlet and/or the liquid outlets of the distributor housings of the respective main dispensing units. Via the switching state it can be determined whether or not the auxiliary dispensing units are fed via the main dispensing units. Furthermore, it can be determined via the switching state whether, alternatively or additionally to the dispensing of liquid through the auxiliary dispensing units, liquid is also dispensed through the main dispensing units.

According to another preferred embodiment of the agricultural spraying device disclosed by the present invention, the control unit is configured to take into account, upon determining the amount of liquid to be provided to the individual main dispensing units, whether or not the respective main dispensing unit is connected to an auxiliary dispensing unit. Preferably, respective connection information is provided manually by a user or stored in a memory of the control unit by the man-ufacturer of the agricultural spraying device as part of an initial configuration.

The object underlying the present invention is also achieved by a method of the type referred to at the beginning, the method according to the present invention comprising conducting liquid from the respective distributor housings of a plurality of main dispensing units through a liquid outlet of the respective distributor housing to a respective auxiliary dispensing unit, and dispensing the liquid onto the agricultural land through the auxiliary dispensing units. The liquid is preferably conducted via flexible lines from the main dispensing units to the auxiliary dispensing units. In particular, the main dispensing units are configured as multiple nozzle bodies, the auxiliary dispensing units being preferably configured as spray nozzles.

According to a preferred embodiment of the method disclosed by the present invention, one or a plurality of auxiliary dispensing units is/are moved along the sprayer boom and in particular transversely to the direction of travel. The moving of the one or the plurality of auxiliary dispensing units may be realized either manually by a user or by actuators of the agricultural spraying device. In addition, the method may comprise fixing the one or the plurality of auxiliary dispensing units that have been moved. Also the fixing may be carried out either manually or via suitable actuators of the agricultural spraying device. The fixing of an auxiliary dispensing unit is preferably carried out in a form-fit and/or in a force-fit manner. In particular, the one or the plurality of auxiliary dispensing units may be clamped in position on a bar of the agricultural spraying device, the bar extending transversely to the direction of travel.

In addition, a method according to the present invention is preferred, in the case of which the flow through the liquid inlet of the respective distributor housings of the main dispensing units is controlled. For example, the liquid inlet of the respective distributor housing may be fully blocked or unblocked. The flow rate may also be controlled such that the amount of liquid flowing into the respective distributor housings is adjusted precisely. Furthermore, the method may comprise controlling the flow rate through the individual liquid outlets of the respective distributor housings of the main dispensing units. The respective liquid outlets of the distributor housings of the main dispensing units may, in this case, be fully unblocked or blocked. In addition, also the amount of liquid discharged from the distributor housings through the respective liquid outlets may be precisely adjustable. Via the flow rate control at the liquid outlets, the feeding of the auxiliary dispensing units and/or the direct dispensing of liquid through the main dispensing units can be controlled.

According to a further embodiment of the method disclosed by the present invention, one or a plurality of auxiliary dispensing units is/are activated by unblocking the liquid outlets connected to the one or the plurality of auxiliary dispensing units to be activated. Alternatively or additionally, one or a plurality of auxiliary dispensing units is/are deactivated by blocking the liquid outlets connected to the one or the plurality of auxiliary dispensing units to be deactivated. Moreover, a method is preferred, in the case of which one or a plurality of main dispensing units is/are activated by unblocking one or a plurality of liquid outlets having a nozzle attachment attached thereto. Alternatively or additionally, one or a plurality of main dispensing units is/are deactivated by blocking one or a plurality of liquid outlets having a nozzle attachment attached thereto.

In addition, a method according to the present invention is preferred, in the case of which the amount of liquid to be provided to the individual main dispensing units for a planned dispensing operation is determined by a control unit of the agricultural spraying device. Moreover, the provision of the determined amount of liquid to the respective main dispensing units may be caused through a control unit of the agricultural spraying device. Upon determining the amount of liquid to be provided to the individual main dispensing units, the interconnection or the fluidic coupling of the main dispensing units and of the auxiliary dispensing units is preferably taken into account.

In addition, a method according to the present invention is of advantage, in the case of which the control unit, upon determining the amount of liquid to be provided to the individual main dispensing units, takes into account the positions of the auxiliary dispensing units, the state, in particular the switching state, of the respective main dispensing units and/or the circumstance whether or not the respective main dispensing unit is connected to an auxiliary dispensing unit.

According to a further preferred embodiment, the method according to the present invention is carried out with an agricultural spraying device according to one of the above-described embodiments. As regards the advantages and modifications of this method, reference is made to the advantages and modifications of the agricultural spraying device according to the present invention.

In the following, preferred embodiments of the present invention will be explained and described in more detail, making reference to the drawings enclosed, in which.

Figure 1:
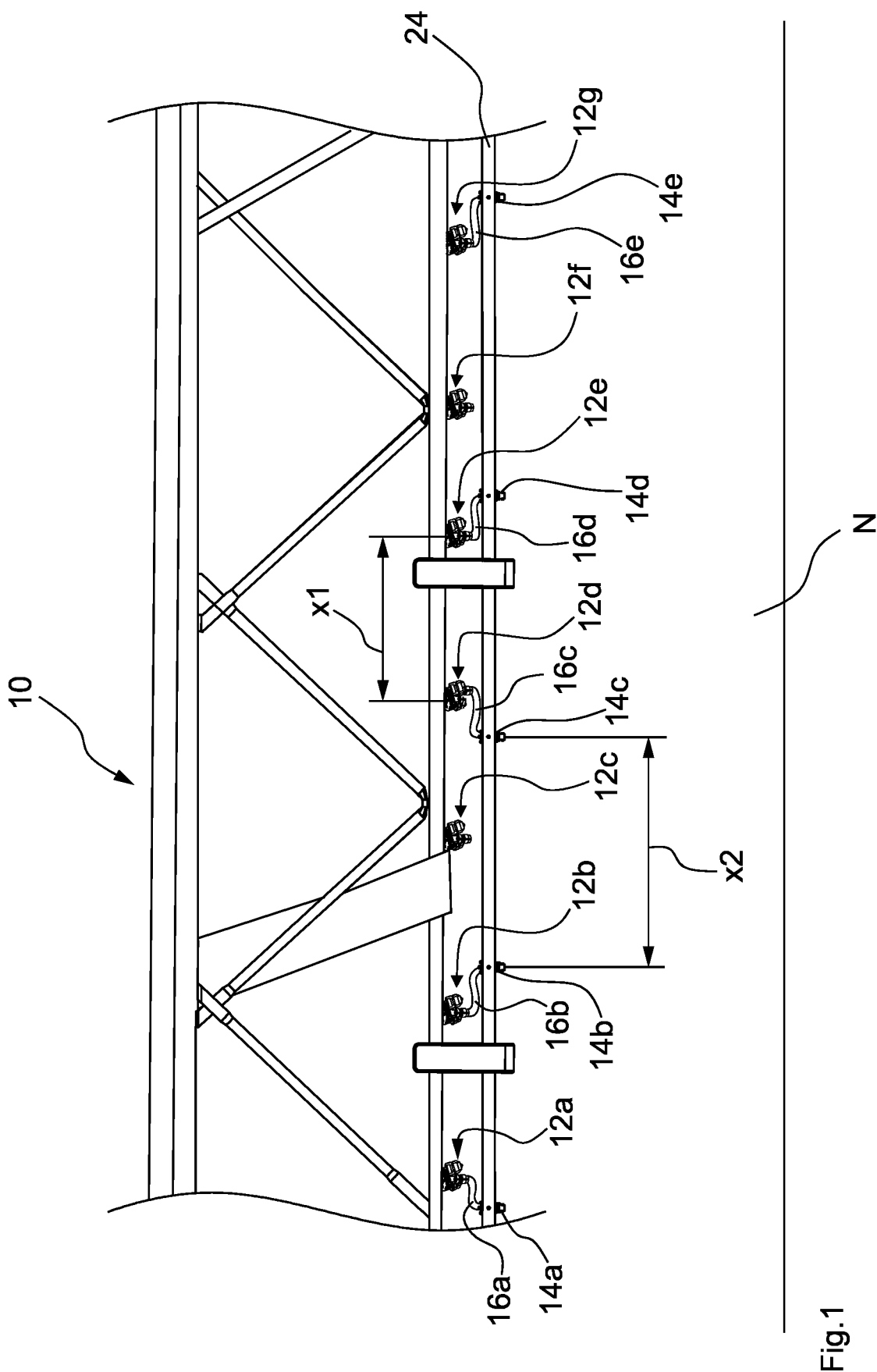
FIG. 1 shows a section of a sprayer boom of an agricultural spraying device according to the present invention.

FIG. 1 shows a portion of a sprayer boom 10 of an agricultural spraying device configured as a field sprayer. The sprayer boom 10 has attached thereto a plurality of main dispensing units 12a-12g configured as multiple nozzle bodies.

Making use of the main dispensing units 12a-12g, liquid can be dispensed onto the agricultural land N. To this end, the main dispensing units 12a-12g each have one or a plurality of nozzle attachments. The main dispensing units 12a-12g are arranged, equidistantly spaced from one another, along the sprayer boom 10, the sprayer boom 10 extending transversely to the direction of travel of the agricultural spraying device. Since the main dispensing units 12a-12g are stationarily attached to the sprayer boom 10, the distance $x1$ between neighboring main dispensing units 12a-12g is fixed and not variable.

Below the main dispensing units 12a-12g, a bar 24 extends. The bar 24 is configured as a multi-part component and acts as a protective tube for the main dispensing units 12a-12g. The bar 24 has attached thereto a plurality of auxiliary dispensing units 14a-14e configured as spray nozzles, so that the auxiliary dispensing units 14a-14e are arranged below the main dispensing units 12a-12g. Also the auxiliary dispensing units 14a-14e are adapted to be used for dispensing liquid onto the agricultural land N.

The auxiliary dispensing units 14a-14e are fed with liquid by the main dispensing units 12a-12g via additional lines 16a-16e. Hence, liquid can be dispensed only via the main dispensing units 12a-12g, only via the auxiliary dispensing units 14a-14e or simultaneously via the main dispensing units 12a-12g and the auxiliary dispensing units 14a-14e. The additional lines 16a-16e are configured as flexible lines, viz. as hoses.

The auxiliary dispensing units 14a-14e are displaceable along the bar 24 and thus transversely to the direction of travel of the agricultural spraying device, so that the distance $x2$ between neighboring auxiliary dispensing units 14a-14e as well as the distance between the main dispensing units 12a-12g and the auxiliary dispensing units 14a-14e can be varied.

In the condition shown, both the auxiliary dispensing units 14a-14e and the main dispensing units 12a-12g are arranged equidistantly from one another. The distance $x2$ between neighboring auxiliary dispensing units 14a-14e is here larger than the distance $x1$ between neighboring main dispensing units 12a-12g. For example, neighboring auxiliary dispensing units 14a-14e are spaced 70 cm apart, while neighboring main dispensing units 12a-12g are spaced 50 cm apart. Hence, only some but not all of the main dispensing units 12a-12g of the agricultural spraying device are connected to an auxiliary dispensing unit 14a-14e.

The main dispensing units 12a-12g are additionally connected to a control unit, the control unit determining the amount of liquid to be provided to the individual main dispensing units 12a-12g for a planned dispensing operation and causing the provision of the determined amount of liquid to the respective main dispensing units 12a-12g. Upon determining the amount of liquid to be provided to the individual main dispensing units 12a-12g, the control unit takes into account the positions of the auxiliary dispensing units 14a-14e, the switching state of the respective main dispensing units 12a-12g and the circumstance whether or not the respective main dispensing unit 12a-12g is connected to an auxiliary dispensing unit 14a-14e.

The information on the positions of the auxiliary dispensing units 14a-14e is input manually by a user, since the auxiliary dispensing units 14a-14e of the agricultural spraying device shown are manually positionable. In other embodiments, the auxiliary dispensing units 14a-14e can be movable via actuators of the agricultural spraying device, so that the positions of the auxiliary dispensing units 14a-14e can also be detected by a suitable detection unit of the agricultural spraying device. In this case, position information need not be provided manually.

Figure 2:
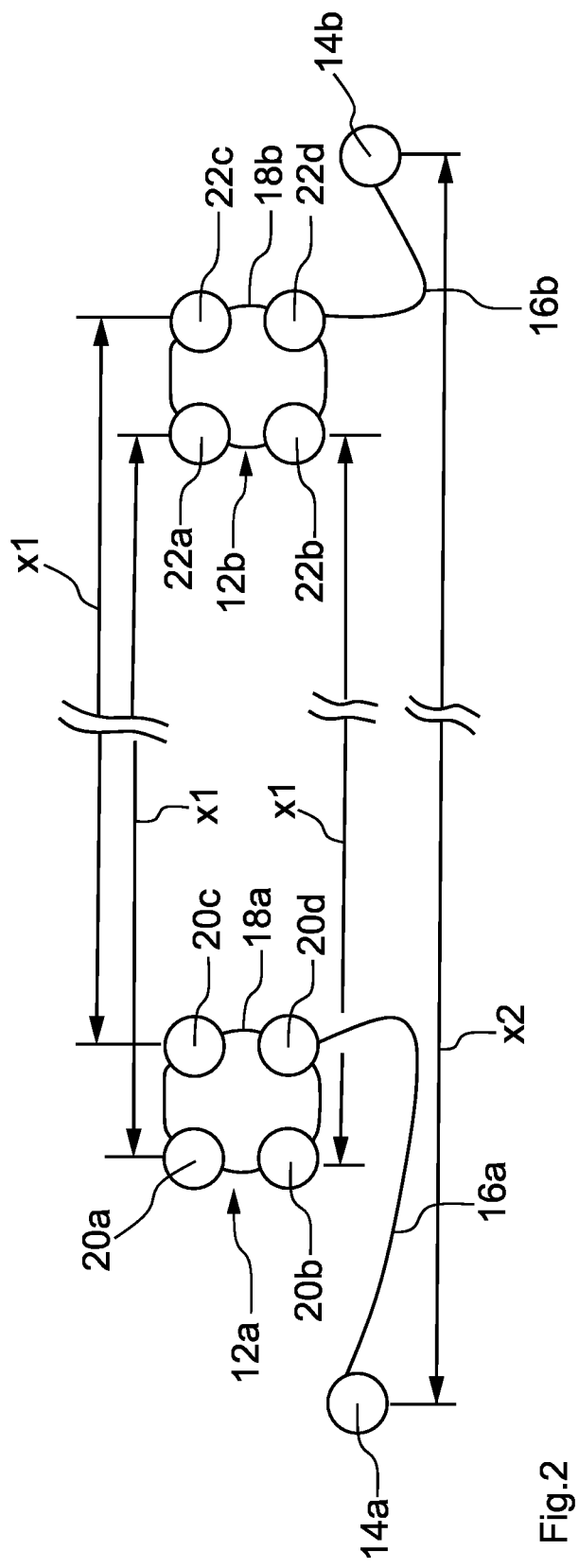
FIG. 2 shows main dispensing units and auxiliary dispensing units of an agricultural spraying device according to the present invention.

FIG. 2 shows two main dispensing units 12a, 12b, the respective main dispensing units 12a, 12b being each connected to an auxiliary dispensing unit 14a, 14b.

The main dispensing units 12a, 12b each comprise a distributor housing 18a, 18b, and the distributor housings 18a, 18b each have one liquid inlet and four liquid outlets 20a-20d, 22a-22d. The distributor housings 18a, 18b selectively advance the liquid flowing in via the liquid inlet to a liquid outlet 20a-20d, 22a-22d or distribute the liquid flowing in via the liquid inlet to a plurality of liquid outlets 20a-20d, 22a-22d.

A respective liquid outlet 20d, 22d of the distributor housings 18a, 18b of the main dispensing units 12a, 12b is connected to an auxiliary dispensing unit 14a, 14b via an additional line 16a, 16b. The other liquid outlets 20a-20c, 22a-22c of the distributor housing 18a, 18b of the main dispensing units 12a, 12c have nozzle attachments, so that the liquid can be dispensed onto the agricultural land N directly through the main dispensing units 12a, 12b and, alternatively or additionally, through the auxiliary dispensing units 14a, 14b.

The main dispensing units 12a, 12b are stationarily attached to the sprayer boom 10. The main dispensing units 12a, 12b are spaced apart from one another at a distance x1 transversely to the direction of travel, i.e. along the sprayer boom 10. Hence, also the liquid outlets 20a, 22a, the liquid outlets 20b, 22b and the liquid outlets 20c, 22c are spaced apart from one another at a distance x1. The distance x1 is not variable in view of the fact that the main dispensing units 12a, 12b are stationarily arranged on the sprayer boom 10. The auxiliary dispensing units 14a, 14b are displaceably attached to the sprayer boom 10. In the condition shown, the auxiliary dispensing units 14a, 14b are spaced apart from one another at a distance x2 transversely to the direction of travel, i.e. along the sprayer boom 10. In view of the displaceability of the auxiliary dispensing units 14a, 14b, the distance x2 is variable. In the condition shown, the distance x2 between the neighboring auxiliary dispensing units 14a, 14b is larger than the distance x1 between the neighboring main dispensing units 12a, 12b.

By means of a control unit, the flow through the liquid inlet and the flow through the individual liquid outlets 20a-20d, 22a-22d of the distributor housings 18a, 18b can be controlled. For flow control, the liquid inlet and the respective liquid outlets 20a-20d, 22a-22d have assigned thereto valve units. By means of the valve units, the respective liquid flow can be unblocked, blocked or adjusted to a defined flow rate. Making use of the valve units, it is thus also possible to switch the auxiliary dispensing units 14a, 14b optionally on and off.

The auxiliary dispensing units 14a, 14b can be activated by unblocking the liquid outlets 20d, 22d connected to the auxiliary dispensing units 14a, 14b. Deactivation of the auxiliary dispensing units 14a, 14b is carried out by blocking the liquid outlets 20d, 22d connected to the auxiliary dispensing units 14a, 14b. In addition, the main dispensing units 12a, 12b can be activated by unblocking one or a plurality of the liquid outlets 20a-20c, 22a-22c, which each have attached thereto a nozzle attachment. Deactivation of the main dispensing units 12a, 12b is carried out by blocking all the liquid outlets 20a-20c, 22a-22c having a nozzle attachment attached thereto.

Figure 3:
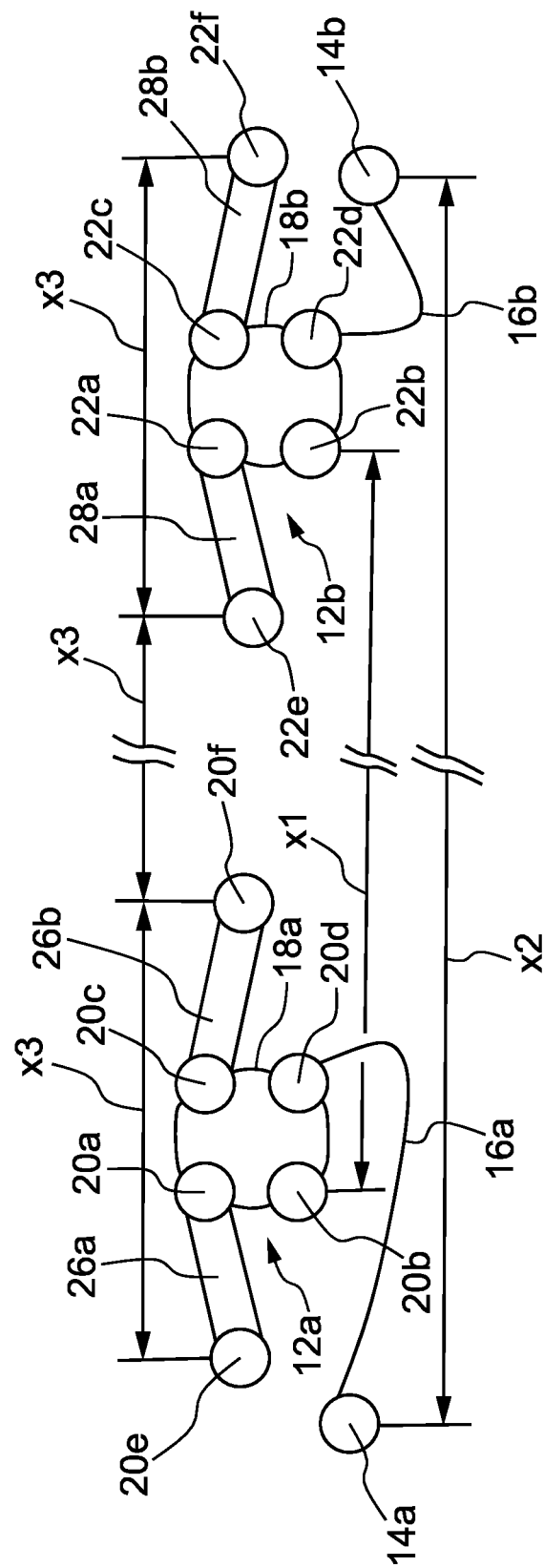
FIG. 3 shows main dispensing units and auxiliary dispensing units of a further agricultural spraying device according to the present invention.

Also FIG. 3 shows two main dispensing units 12a, 12b, the main dispensing units 12a, 12b being each connected to a respective auxiliary dispensing unit 14a, 14b.

The distributor housings 18a, 18b of the main dispensing units 12a, 12b each have one liquid inlet and four liquid outlets 20a-20d, 22a-22d. The liquid outlets 20a, 20c and the liquid outlets 22a, 22c are connected to the liquid outlets 20e, 20f and the liquid outlets 22e, 22f via the housing-internal lines 26a, 26b and the housing-internal lines 28a, 28b, respectively. The liquid outlets 20e, 20f, 22e, 22f are spaced apart from one another at a distance x3, the distance x3 being smaller than the distance x1 between the liquid outlets 20b, 22b.

The distributor housings 18a, 18b selectively advance the liquid flowing in via the liquid inlet to a liquid outlet 20a-20d, 22a-22d or distribute the liquid flowing in via the liquid inlet to a plurality of liquid outlets 20a-20d, 22a-22d. A respective liquid outlet 20d, 22d of the distributor housings 18a, 18b of the main dispensing units 12a, 12b is connected to an auxiliary dispensing unit 14a, 14b via an additional line 16a, 16b. The liquid outlets 20b, 22b and the liquid outlets 20e, 20f, 22e, 22f have nozzle attachments. Hence, the liquid can be dispensed onto the agricultural land N via the liquid outlets 20e, 20f, 22e, 22f, the liquid outlets 20b, 22b and/or the auxiliary dispensing units 14a, 14b.

The main dispensing units 12a, 12b are stationarily attached to the sprayer boom 10, while auxiliary dispensing units 14a, 14b are displaceably attached to the sprayer boom 10, so that the distance x2 between the auxiliary dispensing units 14a, 14b is variable.

By means of a control unit, the flow through the liquid inlet and the flow through the individual liquid outlets 20a-20f, 22a-22f of the distributor housings 18a, 18b can be controlled also in this case. For flow control, the liquid inlet and the respective liquid outlets 20a-20d, 22a-22d have assigned thereto valve units. By means of the valve units, the respective liquid flow can be unblocked, blocked or adjusted to a defined flow rate.

REFERENCE NUMERALS 10 sprayer boom
12a-12g main dispensing units
14a-14e auxiliary dispensing units
16a-16e additional lines
18a, 18b distributor housings
20a-20f liquid outlets
22a-22f liquid outlets
24 bar
26a, 26b lines
28a, 28b lines
N agricultural land
x1, x2, x3 distances

The invention claimed is:
1. An agricultural spraying device, comprising:
a plurality of main dispensing units configured as multiple nozzle bodies and arranged on a sprayer boom, each of the main dispensing units configured for dispensing liquid onto agricultural land and including a distributor housing, the distributor housing having a liquid inlet and a plurality of liquid outlets and being configured to selectively advance liquid flowing in via the liquid inlet to a respective one of the liquid outlets or distribute the liquid to the plurality of liquid outlets; and
a plurality of auxiliary dispensing units, each of the auxiliary dispensing units configured to dispense liquid onto the agricultural land,
wherein the respective one of the liquid outlets of the distributor housings of the plurality of main dispensing units is connected via an additional line to a respective one of the auxiliary dispensing units, and
wherein at least one of the remaining liquid outlets of the distributor housings of the plurality of main dispensing units comprises a nozzle attachment for dispensing the liquid onto the agricultural land directly through at least one of the plurality of main dispensing units.

2. The agricultural spraying device according to claim 1, wherein the main dispensing units are fixedly attached to the sprayer boom and the auxiliary dispensing units are movable along the sprayer boom.

3. The agricultural spraying device according to claim 1, wherein the auxiliary dispensing units are attached to a bar arranged below the sprayer boom and extending along the sprayer boom, and the auxiliary dispensing units are displaceable along the bar.

4. The agricultural spraying device according to claim 1, wherein the distributor housing of a respective one of the plurality of main dispensing units is not connected to the respective one of the auxiliary dispensing units.

5. The agricultural spraying device according to claim 4, wherein the agricultural spraying device is configured to control a flow through the liquid inlet or a flow through the liquid outlets of the distributor housings of the main dispensing units.

6. The agricultural spraying device according to claim 5, wherein the agricultural spraying device is configured to determine an amount of the liquid to be provided to the main dispensing units for a planned dispensing operation and to provide the determined amount of the liquid to the main dispensing units.

7. The agricultural spraying device according to claim 6, wherein the agricultural spraying device is configured to take into account positions of the auxiliary dispensing units upon determining the amount of the liquid to be provided to the main dispensing units.

8. The agricultural spraying device according to claim 6, wherein the agricultural spraying device is configured to take into account switching states of the main dispensing units upon determining the amount of the liquid to be provided to the main dispensing units.

9. The agricultural spraying device according to claim 6, wherein the agricultural spraying device is configured to take into account, upon determining the amount of the liquid to be provided to the main dispensing units, whether or not the respective one of the main dispensing units is connected to the respective one of the auxiliary dispensing units.

10. A method of dispensing liquid onto agricultural land by an agricultural spraying device, comprising the steps of:
feeding liquid into distributor housings of a plurality of main dispensing units arranged on a sprayer boom, the main dispensing units being configured as multiple nozzle bodies for dispensing liquid onto the agricultural land, and the distributor housings each having a liquid inlet and a plurality of liquid outlets and being configured to selectively advance the liquid flowing in via the liquid inlet to one of the liquid outlets or distribute the liquid to the plurality of liquid outlets;
conducting the liquid from the distributor housings of the plurality of main dispensing units through the one of the liquid outlets of a respective one of the distributor housings to a respective one of a plurality of auxiliary dispensing units; and
dispensing the liquid onto the agricultural land through the plurality of auxiliary dispensing units;
conducting the liquid from the distributor housings of the plurality of main dispensing units through at least one of the remaining liquid outlets of the distributor housings of the plurality of main dispensing units; and
dispensing the liquid onto the agricultural land directly through at least one of the plurality of main dispensing units.

11. The method according to claim 10, further comprising:
moving the plurality of auxiliary dispensing units along the sprayer boom; and
fixing the plurality of auxiliary dispensing units that have been moved.

12. The method according to claim 10, further comprising:
controlling a flow through the liquid inlet of the distributor housings of the main dispensing units; and
controlling the flow through the liquid outlets of the distributor housings of the main dispensing units.

13. The method according to claim 10, further comprising:
activating the plurality of auxiliary dispensing units by unblocking
the liquid outlets connected to the plurality of auxiliary dispensing units to be activated;
deactivating the plurality of auxiliary dispensing units by blocking the liquid outlets connected to the plurality of auxiliary dispensing units to be deactivated,
activating at least one of the plurality of main dispensing units by unblocking at least one of the plurality of liquid outlets having a nozzle attachment attached thereto,
deactivating the at least one of the plurality of main dispensing units by blocking the at least one of the plurality of liquid outlets having the nozzle attachment attached thereto.

14. The method according to claim 10, further comprising:
determining, by the agricultural spraying device, an amount of the liquid to be provided to the main dispensing units for a planned dispensing operation;
providing the determined amount of the liquid to the main dispensing units of the agricultural spraying device.

15. The method according to claim 14, wherein, upon determining the amount of the liquid to be provided to the main dispensing units, the agricultural spraying device takes into account positions of the auxiliary dispensing units, a switching state of the main dispensing units and a circumstance of whether or not one of the main dispensing units is connected to one of the auxiliary dispensing units.

* * * * *